(12) United States Patent
Zhao (10) Patent No.: US 11,481,075 B2
(45) Date of Patent: Oct. 25, 2022

(54) TERMINAL, PROTECTIVE CASE, AND SENSING METHOD

(71) Applicant: Honor Device Co., Ltd., Shenzhen (CN)

(72) Inventor: Chunjiang Zhao, Beijing (CN)

(73) Assignee: Honor Device Co., Ltd., Shenzhen (CN)

( * ) Notice: Subject to any disclaimer, the term of this patent is extended or adjusted under 35 U.S.C. 154(b) by 667 days.

(21) Appl. No.: 15/318,096

(22) PCT Filed: Jun. 18, 2014

(86) PCT No.: PCT/CN2014/080198
§ 371 (c)(1),
(2) Date: Dec. 12, 2016

(87) PCT Pub. No.: WO2015/192338
PCT Pub. Date: Dec. 23, 2015

(65) Prior Publication Data
US 2017/0123532 A1    May 4, 2017

(51) Int. Cl.
*G06F 3/044* (2006.01)
*G06F 1/16* (2006.01)
*H04B 1/3888* (2015.01)

(52) U.S. Cl.
CPC .......... *G06F 3/0443* (2019.05); *G06F 1/1628* (2013.01); *H04B 1/3888* (2013.01)

(58) Field of Classification Search
None
See application file for complete search history.

(56) References Cited

U.S. PATENT DOCUMENTS

2007/0257821 A1* 11/2007 Son .......................... G06F 3/016
341/22
2010/0103116 A1* 4/2010 Leung ...................... F21V 11/14
345/173
(Continued)

FOREIGN PATENT DOCUMENTS

CN    102855033 A    1/2013
CN    103123525 A    5/2013
(Continued)

OTHER PUBLICATIONS

Office Action issued in Korean Patent Application No. 10-2017-7000182, dated Nov. 21, 2017, 6 pages.
(Continued)

*Primary Examiner* — Stephen T. Reed
(74) *Attorney, Agent, or Firm* — Conley Rose, P.C.

(57) ABSTRACT

Embodiments of the present invention provide a terminal, a protective case, and a sensing method. The terminal is suitable for removable installation of a protective case that protects a touchscreen of the terminal, and includes: a capacitance detection module, configured to detect a capacitance value of a capacitor module in the touchscreen, where the capacitance value is generated according to the capacitor module and a capacitive sensing body in the protective case; and a processing module, configured to: when it is determined that a change of the capacitance value detected by the capacitance detection module conforms to a first preset rule, determine that the protective case is far away from the terminal; and when it is determined that the change of the capacitance value conforms to a second preset rule, determine that the protective case is near the terminal.

3 Claims, 4 Drawing Sheets

(56) References Cited

U.S. PATENT DOCUMENTS

| | | |
|---|---|---|
| 2010/0315348 A1 | 12/2010 | Jellicoe et al. |
| 2010/0328250 A1 | 12/2010 | Gorsica et al. |
| 2011/0169754 A1 | 7/2011 | Miyazawa et al. |
| 2012/0206126 A1 | 8/2012 | Froniewski et al. |
| 2012/0302164 A1 | 11/2012 | Froniewski et al. |
| 2013/0076614 A1* | 3/2013 | Ive .................. G06F 1/1632 345/156 |
| 2013/0127724 A1 | 5/2013 | Liu |
| 2013/0147754 A1* | 6/2013 | Chuang ............ G06F 3/03545 345/174 |
| 2013/0242505 A1 | 9/2013 | Nguyen et al. |
| 2014/0139477 A1 | 5/2014 | Immonen et al. |
| 2016/0085360 A1* | 3/2016 | Deng .................. G06F 3/0416 345/174 |
| 2016/0373563 A1 | 12/2016 | Ive et al. |

FOREIGN PATENT DOCUMENTS

| | | | |
|---|---|---|---|
| CN | 103257777 | A | 8/2013 |
| CN | 103442105 | A | 12/2013 |
| CN | 103516902 | A | 1/2014 |
| JP | 2006149485 | A | 6/2006 |
| JP | 2009159416 | A | 7/2009 |
| JP | 2009182688 | A | 8/2009 |
| JP | 2013056047 | A | 3/2013 |
| KR | 20130024943 | A | 3/2013 |
| KR | 20140042897 | A | 4/2014 |
| WO | 2012036891 | A2 | 3/2012 |

OTHER PUBLICATIONS

Machine Translation and Abstract of Chinese Publication No. CN2006149485, Jun. 15, 2006, 24 pages.

Machine Translation and Abstract of Japanese Publication No. JP2009159416, Jul. 16, 2009, 20 pages.

Machine Translation and Abstract of Japanese Publication No. JP2009182688, Aug. 13, 2009, 18 pages.

Machine Translation and Abstract of Japanese Publication No. JP2013056047, Mar. 28, 2013, 25 pages.

Foreign Communication From A Counterpart Application, Japanese Application No. 2016-573920, Japanese Office Action dated Feb. 20, 2018, 5 pages.

Foreign Communication From A Counterpart Application, Japanese Application No. 2016-573920, English Translation of Japanese Office Action dated Feb. 20, 2018, 6 pages.

International Search Report (including English translation) issued in corresponding International Application No. PCT/CN2014/080198, dated Mar. 27, 2015, 6 pages.

Extended European Search Report issued in corresponding EP Application No. 14895442, dated May 19, 2017, 8 pages.

First Office Action (including English translation) issued in corresponding Chinese Patent Application No. 201480036868.5, dated Nov. 1, 2017, 22 pages.

Foreign Communication From A Counterpart Application, European Application No. 14895442.3, European Office Action dated Aug. 21, 2019, 8 pages.

* cited by examiner

TERMINAL, PROTECTIVE CASE, AND SENSING METHOD

CROSS-REFERENCE TO RELATED APPLICATION

This application is a National Stage of International Application No. PCT/CN2014/080198, filed on Jun. 18, 2014, which is hereby incorporated by reference in its entirety.

TECHNICAL FIELD

Embodiments of the present invention relate to the field of terminal devices and accessories of the terminal devices, and in particular, to a terminal, a protective case, and a sensing method.

BACKGROUND

When an existing terminal is equipped with a protective case, for example, a leather case, functions of waking up the terminal when the leather case is far away and making the terminal sleep when the leather case is near are implemented by using the leather case is usually supported. To support the functions of waking up the terminal when the leather case is far away and making the terminal sleep when the leather case is near are implemented mainly by detecting, by using a Hall sensor or another magnetic induction sensor that is disposed in the terminal, a magnetic field change caused by a change of a position of a magnet disposed in the leather case. In this manner, a user can wake up the terminal or make the terminal sleep according to whether the leather case is far away or near, so that operations of waking up the terminal and making the terminal sleep become faster and more convenient.

However, detection of the position of the magnet in the protective case has particular requirements on a detection direction and trigger sensitivity of the magnetic induction sensor, and also has a particular requirement on coordination of strength of the magnetic field and a direction of the magnetic field. Therefore, when it is determined whether the leather case is far away or near, there are limitations on both a position of the magnetic induction sensor on a main board and the position of the magnet in the protective case. The magnetic induction sensor causes limitations in manufacturing of the terminal and complexity of manufacturing is increased.

SUMMARY

Embodiments of the present invention provide a terminal, a protective case, and a sensing method, which can reduce complexity of manufacturing a terminal that can determine whether a protective case is far away from or near the terminal.

A first aspect of the present invention provides a terminal, where the terminal is suitable for removable installation of a protective case that protects a touchscreen of the terminal, including:

a capacitance detection module, configured to detect a capacitance value of a capacitor module in the touchscreen, where the capacitance value is generated according to the capacitor module and a capacitive sensing body in the protective case; and a processing module, configured to: if it is determined that a change of the capacitance value detected by the capacitance detection module conforms to a first preset rule, determine that the protective case is far away from the terminal; and if it is determined that the change of the capacitance value conforms to a second preset rule, determine that the protective case is near the terminal.

According to the first aspect, in a first possible implementation manner, the processing module is specifically configured to: if it is determined that the capacitance value detected by the capacitance detection module is greater than a first preset threshold or it is determined according to the capacitance value that a charging time of the capacitor module is greater than a first preset threshold, determine that the protective case is near the terminal; and if it is determined that the capacitance value detected by the capacitance detection module is less than a second preset threshold or it is determined according to the capacitance value that a discharging time of the capacitor module is less than a second preset threshold, determine that the protective case is far away from the terminal.

According to the first aspect, in a second possible implementation manner, the processing module is specifically configured to: if it is determined that a sequence of triggering caused when capacitance values, of preset positions in the capacitor module, detected by the capacitance detection module exceed capacitance thresholds is the same as a first preset trigger sequence, determine that the protective case is far away from the terminal; and if it is determined that the sequence of triggering caused when the capacitance values, of the preset positions in the capacitor module, detected by the capacitance detection module exceed the capacitance thresholds is the same as a second preset trigger sequence, determine that the protective case is near the terminal.

According to a second aspect of the present invention, the protective case is removably installed on a terminal to protect a touchscreen of the terminal, including:

a capacitive sensing body, configured to generate a capacitance value with a capacitor module in the touchscreen of the terminal, so that the terminal detects the capacitance value and determines, according to a preset rule, whether the protective case is far away from or near the terminal.

According to the second aspect, in a first possible implementation manner, the capacitive sensing body is disposed on a side that is near the terminal when the protective case covers the terminal; and the capacitive sensing body is evenly disposed in the protective case, or the capacitive sensing body is disposed at a position, corresponding to a preset position of the touchscreen of the terminal, in the protective case.

A third aspect of the present invention provides a terminal, where the terminal is suitable for removable installation of a protective case that protects a touchscreen of the terminal, including:

a touchscreen including a capacitance detection module and a capacitor module;

a memory; and a processor coupled to the memory, where the capacitance detection module is configured to detect a capacitance value of the capacitor module, and the capacitance value is generated according to the capacitor module and a capacitive sensing body in the protective case; and the processor is configured to: if it is determined that a change of the capacitance value detected by the capacitance detection module conforms to the acquired first preset rule stored in the memory, determine that the protective case is far away from the terminal; and if it is determined that the change of the capacitance value conforms to the acquired second preset rule stored in the memory, determine that the protective case is near the terminal.

According to the third aspect, in a first possible implementation manner, the processor is specifically configured to: if it is determined that the capacitance value detected by the capacitance detection module is greater than a first preset threshold or it is determined according to the capacitance value that a charging time of the capacitor module is greater than a first preset threshold, determine that the protective case is near the terminal; and if it is determined that the capacitance value detected by the capacitance detection module is less than a second preset threshold or it is determined according to the capacitance value that a discharging time of the capacitor module is less than a second preset threshold, determine that the protective case is far away from the terminal.

According to the third aspect, in a second possible implementation manner, the processor is specifically configured to: if it is determined that a sequence of triggering caused when capacitance values, of preset positions in the capacitor module, detected by the capacitance detection module exceed capacitance thresholds is the same as a first preset trigger sequence, determine that the protective case is far away from the terminal; and if it is determined that the sequence of triggering caused when the capacitance values, of the preset positions in the capacitor module, detected by the capacitance detection module exceed the capacitance thresholds is the same as a second preset trigger sequence, determine that the protective case is near the terminal.

A fourth aspect of the present invention provides a sensing method, where the method is applied to a terminal, and the terminal is suitable for removable installation of a protective case that protects a touchscreen of the terminal, including:

detecting a capacitance value of a capacitor module in the touchscreen, where the capacitance value is generated according to the capacitor module and a capacitive sensing body in the protective case; and if it is determined that a change of the detected capacitance value conforms to a first preset rule, determining that the protective case is far away from the terminal; and if it is determined that the change of the capacitance value conforms to a second preset rule, determining that the protective case is near the terminal.

According to the fourth aspect, in a first possible implementation manner, the if it is determined that a change of the detected capacitance value conforms to a first preset rule, determining that the protective case is far away from the terminal; and if it is determined that the change of the capacitance value conforms to a second preset rule, determining that the protective case is near the terminal includes:

if it is determined that the detected capacitance value is greater than a first preset threshold or it is determined according to the capacitance value that a charging time of the capacitor module is greater than a first preset threshold, determining that the protective case is near the terminal; and if it is determined that the detected capacitance value is less than a second preset threshold or it is determined according to the capacitance value that a discharging time of the capacitor module is less than a second preset threshold, determining that the protective case is far away from the terminal.

According to the fourth aspect, in a second possible implementation manner, the if it is determined that a change of the detected capacitance value conforms to a first preset rule, determining that the protective case is far away from the terminal; and if it is determined that the change of the capacitance value conforms to a second preset rule, determining that the protective case is near the terminal includes:

if it is determined that a sequence of triggering caused when detected capacitance values, of preset positions, in the capacitor module exceed capacitance thresholds is the same as a first preset trigger sequence, determining that the protective case is far away from the terminal; and if it is determined that the sequence of triggering caused when the detected capacitance values, of the preset positions, in the capacitor module exceed the capacitance thresholds is the same as a second preset trigger sequence, determining that the protective case is near the terminal.

According to the terminal, the protective case, and the sensing method that are provided in the embodiments of the present invention, the terminal is suitable for removable installation of a protective case that protects a touchscreen of the terminal, and includes: a capacitance detection module, configured to detect a capacitance value of a capacitor module in the touchscreen, where the capacitance value is generated according to the capacitor module and a capacitive sensing body in the protective case; and a processing module, configured to: if it is determined that a change of the capacitance value detected by the capacitance detection module conforms to a first preset rule, determine that the protective case is far away from the terminal; and if it is determined that the change of the capacitance value conforms to a second preset rule, determine that the protective case is near the terminal. In this manner, the terminal may determine, by using a change of a capacitance value, whether a protective case is far away from the terminal or near the terminal, and a magnetic induction sensor no longer needs to be disposed on the terminal. Therefore, no limitation is caused by the magnetic induction sensor during manufacturing of the terminal, thereby reducing complexity of manufacturing a terminal that can determine whether a protective case is far away from or near the terminal.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
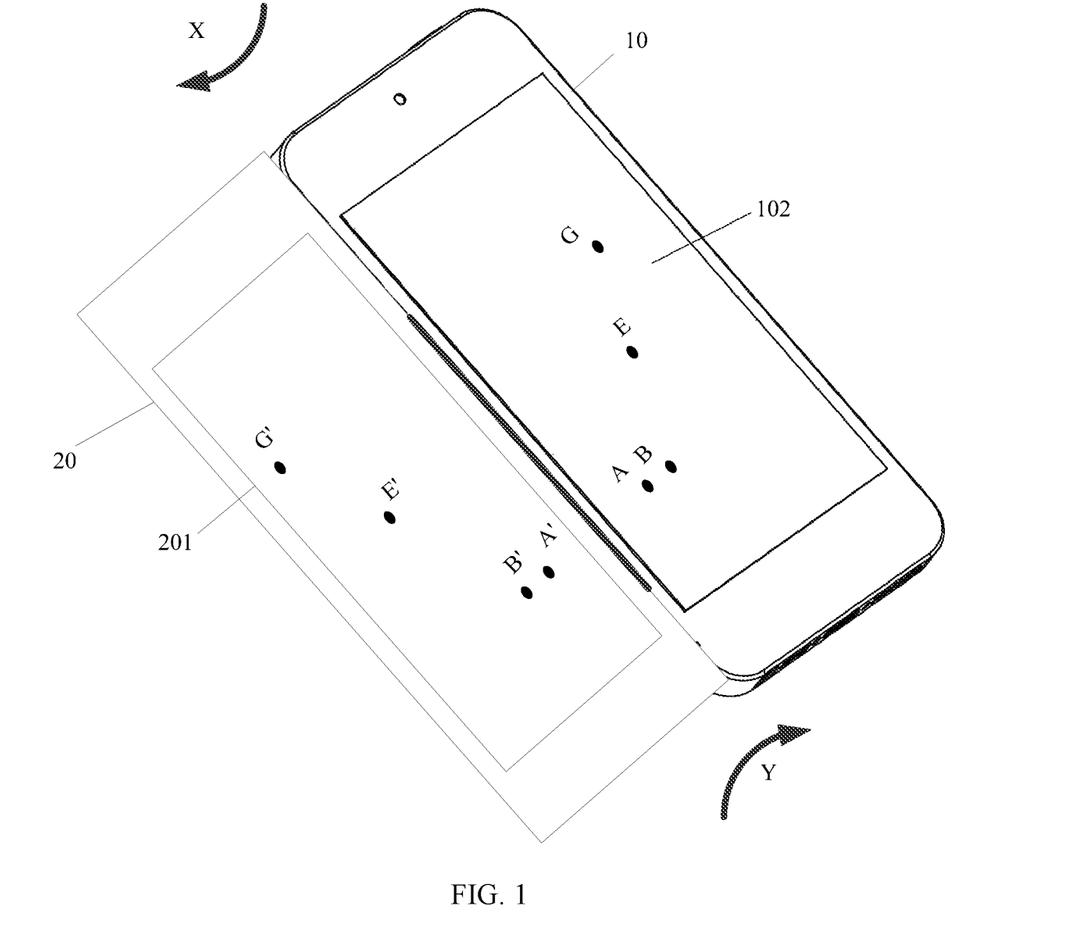
FIG. 1 is a schematic structural diagram of a terminal on which a protective case is installed according to an embodiment of the present invention.

FIG. 1 is a schematic structural diagram of a terminal on which a protective case is installed according to an embodiment of the present invention. The terminal 10 includes: a capacitance detection module (not shown in FIG. 1), a touchscreen 102 and a processing module (not shown in FIG. 1), where the touchscreen 102 includes a capacitor module and the capacitance detection module (neither shown in FIG. 1). The protective case 20 includes a capacitive sensing body 201. In addition, the protective case 20 is suitable to be removably installed on the terminal 10 to protect the touchscreen 102 of the terminal.

It should be noted that an example in which a size of the protective case 20 is the same as that of the terminal 10, the capacitive sensing body 201 is evenly distributed on the protective case 20, and a size of the capacitive sensing body 201 is the same as a size of the touchscreen 102 is used in FIG. 1 for description. A shape, a size, and a dimension of the protective case 20 are not limited and can be set flexibly. In addition, a position of the protective case 20 is not limited either, and may be any position at which the protective case 20 and the terminal 10 can sense each other. The capacitive sensing body 201 may be distributed on the protective case 20 in any other form, for example, be correspondingly distributed on the protective case 20 according to a preset position of the terminal in the capacitor module, and the like.

Further, the touchscreen 102 may be a conventional capacitive touchscreen, or may be a touchscreen that supports gesture switching.

It should be noted that, as shown in FIG. 1, when the protective case 20 moves along an X direction, the protective case 20 is far away from the terminal 10. When the protective case 20 moves along a Y direction, the protective case 20 is near the terminal 10. When the protective case 20 is far away from the terminal 10, different capacitance values are generated when the capacitive sensing body 201 in the protective case 20 is near or far away from the capacitor module. Therefore, when the protective case 20 moves along the X direction or along the Y direction, the capacitance detection module in the terminal is enabled to detect a change of the capacitance value. In this manner, the terminal may further determine, by using the capacitance value, whether the protective case 20 is far away from the terminal 10 or near the terminal 10.

It should be noted that in the prior art, a change of strength of magnetic field of a magnet disposed in a protective case is detected by using a magnetic induction sensor disposed in a terminal, to determine whether the protective case is near the terminal or far away from the terminal. In this embodiment of the present invention, only the existing capacitance detection module in the touchscreen needs to be used to perform detection on the capacitor module to obtain the capacitance value, and then performs determining according to the capacitance value, so that no sensor needs to be added, thereby reducing manufacturing costs of a terminal.

Further, when the protective case, for example, a leather case, is far away from the touchscreen 102 of the terminal 10, as an included angle between the leather case and the touchscreen increases, the capacitance detection module can detect that the capacitance value at the preset position decreases. For example, the capacitance value decreases to be less than a preset threshold within a unit time, and it may be determined that the leather case is far away from the touchscreen 102. Alternatively, a quantity of preset positions of capacitor modules in the touchscreen 102 decreases to be less than a preset threshold, and it may be determined that the leather case is far away from the touchscreen 102. For example, the preset threshold is five, and the quantity of preset positions is ten. When it is determined that the quantity of the preset positions that can be detected by the capacitance detection module 101 decreases to five, it is considered that the leather case is far away from the terminal, and the touchscreen 102, some application programs, and the like of the terminal 10 may be woken up.

It should be noted that the capacitor module in the touchscreen 102 may be a thin plate having a circular shape, a rectangular shape, and the like. If the capacitor module is a circular thin plate, the capacitance value generated by the capacitor module and the capacitive sensing body 201 is $C=\varepsilon S/4\pi kd$, where S is an area of overlap between the capacitor module and the capacitive sensing body 201, and if the capacitor module and the capacitive sensing body 201 are not arranged in parallel, S is an area of a projected portion of the capacitive sensing body 201 onto the capacitor module; $\varepsilon$ is a dielectric coefficient of a medium; d is a distance between parallel plates; $\pi=3.14$, and k is an electrostatic force constant. When the leather case is opened, the area of overlap S becomes smaller because of existence of an oblique angle, a distance d between the capacitor module and the capacitive sensing body 201 becomes larger, and therefore the capacitance value becomes smaller. When the leather case is closed, the area of overlap S becomes larger, the distance d becomes smaller, and therefore the capacitance value becomes larger. Therefore, it may be determined by using a change of a capacitance value whether the leather case is far away from the terminal 10 or near the terminal 10.

Figure 2:
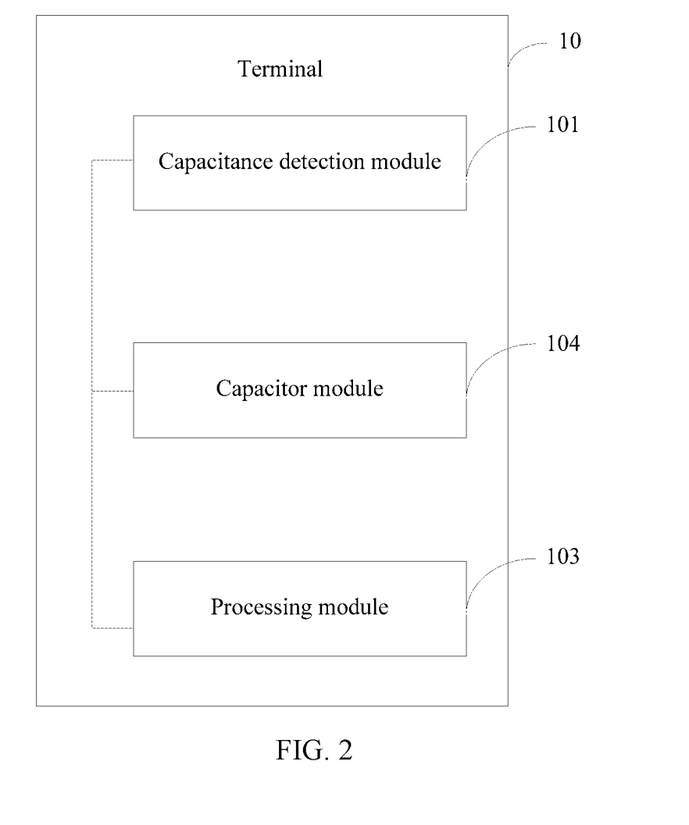
FIG. 2 is a schematic structural diagram of a terminal according to an embodiment of the present invention.

FIG. 2 is a schematic structural diagram of a terminal according to an embodiment of the present invention. As shown in FIG. 2, the terminal 10 includes: a capacitance detection module 101, a touchscreen (not shown in FIG. 2), a processing module 103, and a capacitor module 104, where the capacitance detection module 101 and the capacitor module 104 are located inside the touchscreen. It is easy to be understood that the processing module 103 may be integrated within a processor of the terminal or may be independent of the processor, which is not limited in this embodiment of the present invention herein.

The capacitance detection module 101 is configured to detect a capacitance value of the capacitor module 104 in the touchscreen, where the capacitance value is generated according to the capacitor module 104 and a capacitive sensing body in the protective case.

It should be noted that the capacitance detection module 101 detects the capacitance value of the capacitor module 104 in the touchscreen. It may be considered that all positions of the entire capacitor module 104 are preset positions, and detection is performed on all points of the entire capacitor module 104, that is, if a size of the capacitor module 104 is the same as that of the touchscreen, detection is performed on the entire touchscreen. Alternatively, it may be considered that an individual position in the capacitor module 104 is a preset position, and detection is performed on only the preset position of the capacitor module 104. A preferable solution is the latter one. In this manner, power consumption may be reduced.

The processing module 103 is configured to: if it is determined that a change of the capacitance value detected by the capacitance detection module 101 conforms to a first preset rule, determine that the protective case is far away from the terminal; and if it is determined that the change of the capacitance value conforms to a second preset rule, determine that the protective case is near the terminal.

Further, the processing module 103 is further configured to: if it is determined that the protective case is far away from the terminal, wake up the touchscreen; and if it is determined that the protective case is near the terminal, make the touchscreen sleep.

It should be noted that the processing module 103 is configured to: if it is determined that a change of the capacitance value, of the processing module 103 at the preset position, detected by the capacitance detection module 101 conforms to the first preset rule, determine that the protective case is far away from the terminal; and if it is determined that the change of the capacitance value of the processing module 103 at the preset position conforms to the second preset rule, determine that the protective case is near the terminal. The preset position may be within a circle with the capacitor module 104 being a geometrical center and a radius being 0.5 mms. The preset position may be further five touch points, which are respectively located at a central point, an upper left corner, an upper right corner, a lower left corner, a lower right corner, and the like of the capacitor module 104. In this case, the preset position includes multiple position points in the capacitor module 104. Therefore, a case in which the processing module 103 mistakenly determines that the protective case is near or far away because of a change of a capacitance value due to a wrong touch on a single point is effectively avoided.

For example, if the processing module 103 determines that the capacitance value detected by the capacitance detection module 101 is greater than a first preset threshold, it is determined that the protective case is near the terminal. For example, if the first preset threshold is five coulombs, when the processing module 103 determines that the capacitance value detected by the capacitance detection module 101 is greater than five coulombs, it is determined that the protective case is near the terminal.

Alternatively, if the processing module 103 determines the capacitance value detected by the capacitance detection module 101 and then determines, according to the capacitance value, that a charging time of the capacitor module 104 is greater than the first preset threshold, it is determined that the protective case is near the terminal. For example, the capacitance value is obtained though detection by the capacitance detection module 101, and the charging time may be calculated by the processing module 103 according to the capacitance value. If the first preset threshold is three milliseconds, when the charging time is greater than the first preset threshold, that is, greater than three milliseconds, it is determined that the protective case is near the terminal, and the like.

Likewise, if it is determined that the capacitance value detected by the capacitance detection module 101 is less than a second preset threshold or it is determined according to the capacitance value that a discharging time of the capacitor module is less than a second preset threshold, or it is determined according to the capacitance value that a quantity of the capacitor modules is less than a second preset threshold, or it is determined according to the capacitance value that the quantity of the capacitor modules is greater than a third preset threshold, it is determined that the protective case is far away from the terminal.

For example, if it is determined that a sequence of triggering caused when capacitance values, of preset positions in the capacitor module 104, detected by the capacitance detection module 101 exceed capacitance thresholds is the same as a first preset trigger sequence, the processing module 103 determines that the protective case is far away from the terminal; and if it is determined that the sequence of triggering caused when the capacitance values, of the preset positions in the capacitor module 104, detected by the capacitance detection module 101 exceed the capacitance thresholds is the same as a second preset trigger sequence, determines that the protective case is near the terminal.

As shown in FIG. 1, the preset positions in the capacitor module 104 may be A, B, E, and G. The first preset trigger sequence is A, B, E, and G, and the second preset trigger sequence is G, E, B, and A. In this embodiment, an example in which the first preset trigger sequence is opposite to the second preset trigger sequence is used for description, but no limitation is set thereof. If it is determined that the sequence of triggering of the capacitance thresholds in the capacitor module 104 in detection by the capacitance detection module 101 is A, B, E, and G, it is determined that the protective case is far away from the terminal, and it is determined to wake up the terminal; and if it is determined that the sequence of triggering of the capacitance thresholds in the capacitor module 104 in detection by the capacitance detection module 101 is G, E, B, and A, it is determined that the protective case is near the terminal, and it is determined to wake up the terminal.

According to the terminal provided in this embodiment of the present invention, the terminal is suitable for removable installation of a protective case that protects a touchscreen of the terminal, and includes: a capacitance detection module, configured to detect a capacitance value of a capacitor module in the touchscreen, where the capacitance value is generated according to the capacitor module and a capacitive sensing body in the protective case; and a processing module, configured to: if it is determined that a change of the capacitance value detected by the capacitance detection module conforms to a first preset rule, determine that the protective case is far away from the terminal; and if it is determined that the change of the capacitance value conforms to a second preset rule, determine that the protective case is near the terminal. In this manner, the terminal may determine, by using a change of a capacitance value, whether a protective case is far away from the terminal or near the terminal, and a magnetic induction sensor no longer needs to be disposed on the terminal. Therefore, no limitation is caused by the magnetic induction sensor during manufacturing of the terminal, thereby reducing complexity of manufacturing a terminal that can determine whether a protective case is far away from or near the terminal.

In addition, because a sensor such as a magnetic induction sensor no longer needs to be disposed on the terminal, a cost of manufacturing a terminal is reduced, and overall power consumption of the terminal can be reduced without power consumption of the magnetic induction sensor.

Figure 3:
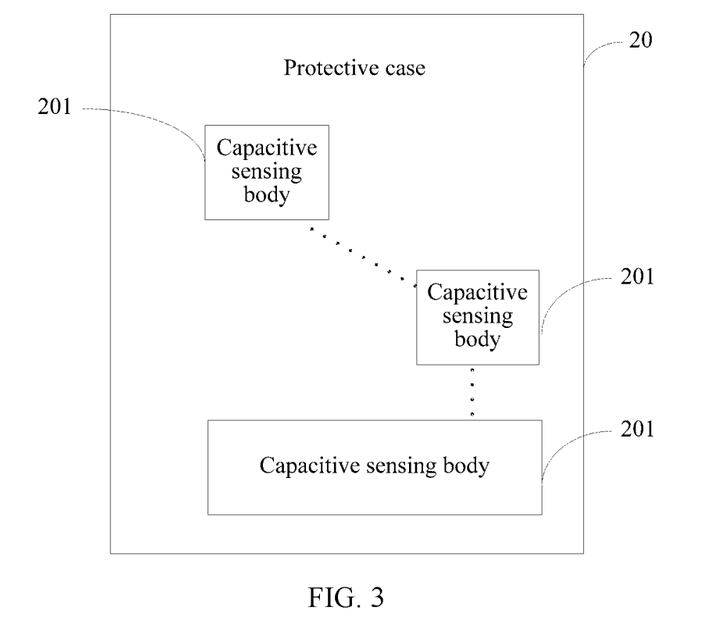
FIG. 3 is a schematic structural diagram of a protective case according to an embodiment of the present invention.

FIG. 3 is a schematic structural diagram of a protective case according to an embodiment of the present invention. The protective case 20 is shown in FIG. 1. The protective case 20 is removably installed on a terminal to protect a touchscreen 102 of the terminal. The protective case may be a leather case that can be engaged on the terminal, and the like. A shape, a size, and a dimension of the protective case 20 are not limited and can be set flexibly. In addition, a position of the protective case 20 is not limited either, and may be any position at which the protective case 20 and the terminal can sense each other. As shown in FIG. 3, the protective case 20 includes: a capacitive sensing body 201.

The capacitive sensing body 201 is configured to generate a capacitance value with a capacitor module in the touchscreen of the terminal, so that the terminal detects the capacitance value and determines, according to a preset rule, whether the protective case is far away from or near the terminal.

It should be noted that these capacitive sensing body 201 may be separately disposed on the protective case 20, or may be connected to each other and are disposed, as a whole, on the protective case 20, and a shape, a size, and a dimension of the capacitive sensing body 201 are not limited.

For example, the capacitive sensing body 201 may be evenly disposed in the protective case 20, that is, may be evenly disposed in an interlayer of the protective case as a whole that has a size same as that of the protective case or that has a size less than that of the protective case; or the capacitive sensing body 201 may be disposed at a position, for example, A', B', E', and G' in FIG. 1, corresponding to a preset position of the terminal, in the protective case. Setting of positions, which correspond to the preset positions, of multiple capacitive sensing body 20 is used FIG. 3 for description, and not for limitation.

For example, the capacitive sensing body 201 may be at least one type of metal, conductive fabric, conductive paint, silica gel, or conductive fiber, but is not limited to these listed materials. For example, the capacitive sensing body 201 at the position B' is conductive fabric, the capacitive sensing body 201 at the position G' is silica gel, the capacitive sensing body 201 at the position A' is metal, or all the capacitive sensing bodies 201 may be conductive fiber, and the like.

Further, the capacitive sensing body 201 is disposed on a side that is near the terminal when the protective case covers the terminal. In this manner, when the protective case is turned to a rear face of the terminal, compared to a case in which the protective case is in front of the terminal, a capacitance value generated by the capacitor module becomes very small, a difference between these two states is very obvious, and the terminal can detect the difference, which does not cause the terminal to enter a sleep state because the terminal falsely outputs a terminal signal.

No magnet is disposed on the protective case provided in this embodiment of the present invention. Therefore, a problem of interference to a magnetic component on the terminal when the protective case is near the terminal is effectively avoided.

Figure 4:
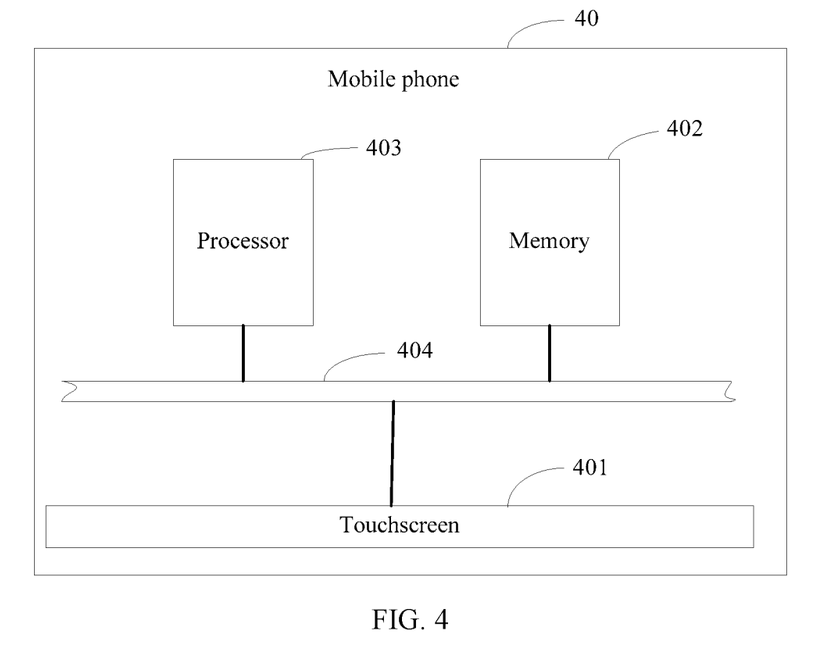
FIG. 4 is a schematic structural diagram of a mobile phone according to another embodiment of the present invention.

FIG. 4 is a schematic structural diagram of a mobile phone according to another embodiment of the present invention. As shown in FIG. 4, an example in which the terminal is a mobile phone is used for description, and the terminal may be further another terminal device such as a tablet computer. It should be noted that, the mobile phone 40 shown in the figure is merely an example of a mobile terminal, and the mobile phone 40 may include more components or fewer components than those shown in the figure, or two or more components may be combined, or a different arrangement of components may be used. The components shown in the figure may be implemented in hardware, software, or a combination of hardware and software that includes one or more signal processing and/or application-specific integrated circuits.

A mobile phone is used herein as an example for specific description. FIG. 4 is a schematic structural diagram of a mobile phone suitable for removable installation of a protective case that protects a touchscreen of a terminal according the present invention. As shown in FIG. 4, the mobile phone 40 includes a touchscreen 401, a memory 402, and a processor 403 coupled to the memory 402. The touchscreen 401, the memory 402, and the processor 403 are connected to each other by using a bus 404. The touchscreen 401 includes a capacitance detection module and a capacitor module (not shown in the figure). In the figure, a section A-A is a section that divides an internal structure and an external structure of the mobile phone 40.

The mobile phone 40 may further include existing hardware such as a peripheral interface, an RF circuit, an audio circuit, a speaker, a power management chip, and an input/output (I/O) port, which are not shown one by one in the figure.

It should be noted that, the mobile phone provided in this embodiment is merely an example of the mobile terminal. A server involved in this embodiment of the present invention may include more components or fewer components than those shown in FIG. 4, or two or more components may be combined, or a different arrangement or setting of components may be used; and the components may be implemented in hardware, software, or a combination of hardware and software that includes one or more signal processing and/or application-specific integrated circuits.

The following gives a detailed description on the mobile phone 40 provided in this embodiment.

The capacitance detection module in the touchscreen 401 is configured to detect a capacitance value of the capacitor module, where the capacitance value is generated according to the capacitor module 104 and a capacitive sensing body in the protective case.

It should be noted that the capacitance detection module detects the capacitance value of the capacitor module in the touchscreen 401. It may be considered that all positions of the entire capacitor module are preset positions, and detection is performed on all points of the entire capacitor module. That is, if a size of the capacitor module is the same as that of the touchscreen 401, detection is performed on the entire touchscreen 401. Alternatively, it may be considered that a position in the capacitor module is a preset position, and detection is performed only on the preset position of the capacitor module. A preferable solution is the latter one. In this manner, power consumption may be reduced.

The processor 403 is configured to: if it is determined that a change of the capacitance value detected by the capacitance detection module conforms to an acquired first preset rule stored in the memory 402, determine that the protective case is far away from the mobile phone; and if it is determined that the change of the capacitance value conforms to an acquired second preset rule stored in the memory 402, determine that the protective case is near the mobile phone.

For example, the processor 403 may be configured to: if it is determined that the capacitance value detected by the capacitance detection module is greater than a first preset threshold or it is determined according to the capacitance value that a charging time of the capacitor module is greater than a first preset threshold, determine that the protective case is near the mobile phone; and if it is determined that the capacitance value detected by the capacitance detection module is less than a second preset threshold or it is determined according to the capacitance value that a discharging time of the capacitor module is less than a second preset threshold, determine that the protective case is far away from the mobile phone.

The processor 403 may be further configured to: if it is determined that a sequence of triggering caused when capacitance values, of preset positions in the capacitor module, detected by the capacitance detection module exceed capacitance thresholds is the same as a first preset trigger sequence, determine that the protective case is far away from the mobile phone; and if it is determined that the sequence of triggering caused when the capacitance values, of the preset positions in the capacitor module, detected by the capacitance detection module exceed the capacitance thresholds is the same as a second preset trigger sequence, determine that the protective case is near the mobile phone.

It should be noted that a specific working method of the processor 403 is the same as the method of the processing module in the foregoing embodiment, and the method of the processing module is described in the foregoing embodiment. Details are not described herein again.

Further, the processor 403 is further configured to: when it is determined that the protective case is far away from the mobile phone 40, wake up the touchscreen 401; and when it is determined that the protective case is near the mobile phone 40, make the touchscreen 401 sleep. In addition, the mobile phone 40 may perform another operation according to determining that the protective case is far away, which is not limited herein.

It should be noted that the terminal outputs an interrupt signal or an activation signal by using detection of a capacitance value parameter, that is, makes the mobile phone 40 sleep or wakes up the mobile phone 40. Therefore, a sensor such as a magnetic induction sensor does not need to be disposed on the mobile phone 40, thereby reducing a cost of manufacturing the mobile phone 40, and overall power consumption of the mobile phone 40 may be reduced without power consumption of the magnetic induction sensor.

Figure 5:
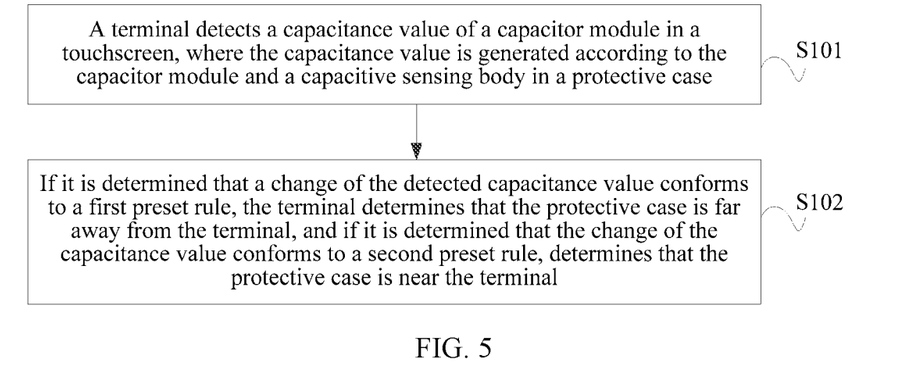
FIG. 5 is a schematic flowchart of a sensing method according to an embodiment of the present invention.

FIG. 5 is a schematic flowchart of a sensing method according to an embodiment of the present invention. The method is applied to a terminal, where the terminal may be the terminal provided in FIG. 2 or the mobile phone provided in FIG. 4, and the terminal is suitable for removable installation of a protective case that protects a touchscreen of the terminal, where the protective case may be the protective case provided in FIG. 3. As shown in FIG. 5, the method includes:

S101: A terminal detects a capacitance value of a capacitor module in a touchscreen, where the capacitance value is generated according to the capacitor module and a capacitive sensing body in a protective case.

S102: If it is determined that a change of the detected capacitance value conforms to a first preset rule, the terminal determines that the protective case is far away from the terminal; and if it is determined that the change of the capacitance value conforms to a second preset rule, determines that the protective case is near the terminal.

For example, if it is determined that the detected capacitance value is greater than a first preset threshold or it is determined according to the capacitance value that a charging time of the capacitor module is greater than a first preset threshold, the terminal determines that the protective case is near the terminal; and if it is determined that the detected capacitance value is less than a second preset threshold or it is determined according to the capacitance value that a discharging time of the capacitor module is less than a second preset threshold, determines that the protective case is far away from the terminal.

Alternatively, if it is determined that a sequence of triggering caused when detected capacitance values, of preset positions, in the capacitor module exceed capacitance thresholds is the same as a first preset trigger sequence, the terminal determines that the protective case is far away from the terminal; and if it is determined that the sequence of triggering caused when the detected capacitance values, of the preset positions, in the capacitor module exceed the capacitance thresholds is the same as a second preset trigger sequence, determines that the protective case is near the terminal.

Figure 6:
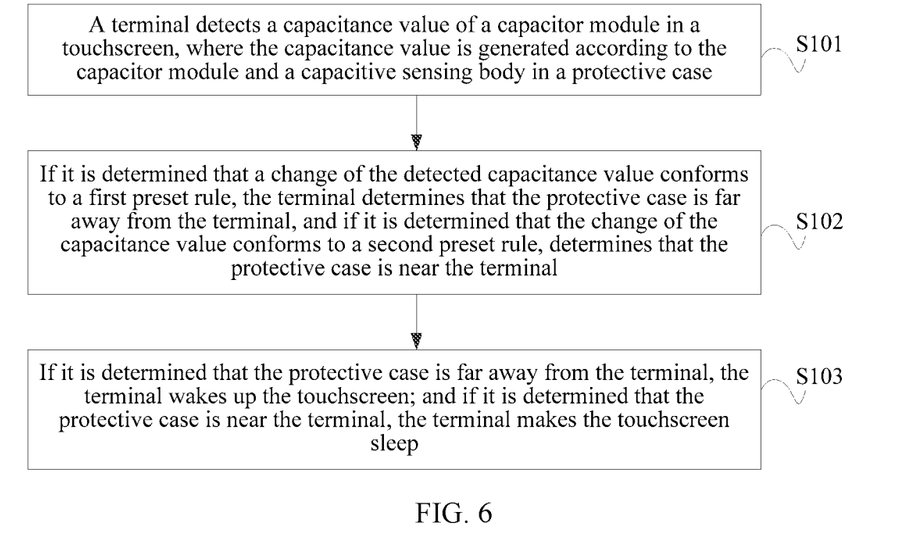
FIG. 6 is a schematic flowchart of another sensing method according to an embodiment of the present invention.

Further, FIG. 6 is a schematic flowchart of another sensing method according to an embodiment of the present invention. As shown in FIG. 6, based on FIG. 5, after step S102, the method further includes:

S103: If it is determined that the protective case is far away from the terminal, the terminal wakes up the touchscreen; and if it is determined that the protective case is near the terminal, the terminal makes the touchscreen sleep.

According to the sensing method provided in this embodiment of the present invention, the sensing method is applied to a terminal, and the terminal is suitable for removable installation of a protective case that protects a touchscreen of the terminal, and includes: a capacitance detection module, configured to detect a capacitance value of a capacitor module in the touchscreen, where the capacitance value is generated according to the capacitor module and a capacitive sensing body in the protective case; and a processing module, configured to: if it is determined that a change of the capacitance value detected by the capacitance detection module conforms to a first preset rule, determine that the protective case is far away from the terminal; and if it is determined that the change of the capacitance value conforms to a second preset rule, determine that the protective case is near the terminal. In this manner, the terminal may determine, by using a change of a capacitance value, whether a protective case is far away from the terminal or near the terminal, and a magnetic induction sensor no longer needs to be disposed on the terminal. Therefore, no limitation is caused by the magnetic induction sensor during manufacturing of the terminal, thereby reducing complexity of manufacturing a terminal that can determine whether a protective case is far away from or near the terminal.

The terminal involved in the embodiments of the present invention includes the terminals that are provided in FIG. 1 and FIG. 2 and the mobile phone provided in FIG. 4, but is not limited thereto. Another terminal that has a capability of sensing, by using the sensing method, whether a protective case is far away from or near the terminal shall fall within the protection scope of the present invention.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A system, comprising:
a terminal including a touchscreen; and
a protective case removably installed on the terminal to protect the touchscreen of the terminal,
wherein the protective case comprises:
an inner edge rotatably coupled to the terminal and configured to enable the protective case to rotate between a closed position and an opened position;
a rigid main body that is not foldable, that has a shape corresponding to a shape of the terminal, and that protects the terminal when the protective case is in the closed position;
an outer edge of the protective case that is located at an opposite side of the rigid main body from the inner edge;
a top edge of the protective case that extends between the inner edge and the outer edge;
a bottom edge of the protective case that extends between the inner edge and the outer edge, wherein the top edge and the bottom edge are separated by the rigid main body; and
a plurality of capacitive sensing bodies configured to generate capacitance values with capacitor modules in the touchscreen of the terminal, wherein each of the plurality of capacitive sensing bodies has a unique position location on the rigid main body between the inner edge and the outer edge and between the top edge and the bottom edge such that each of the plurality of capacitive sensing bodies is a different distance from the touchscreen, and
wherein the terminal is configured to:
store a first preset trigger sequence of the capacitive sensing bodies, wherein the first preset trigger sequence comprises a first order in which each of the capacitive sensing bodies is triggered;
store a second preset trigger sequence of the capacitive sensing bodies, wherein the second preset trigger sequence comprises a second order in which each of the capacitive sensing bodies is triggered, and wherein the second order is opposite of the first order;
detect a trigger sequence of the capacitive sensing bodies;
compare the trigger sequence to the first preset trigger sequence and the second preset trigger sequence;
determine that the protective case is in the opened position corresponding to a wake state in response to the trigger sequence matching the first preset trigger sequence;
determine that the protective case is in the closed position corresponding to a sleep state in response to the trigger sequence matching the second preset trigger sequence;
output an activation signal to put the terminal in the wake state in response to the trigger sequence matching the first preset trigger sequence; and output an interrupt signal to put the terminal in the sleep state in response to the trigger sequence matching the second preset trigger sequence.

2. A system, comprising:
a protective case comprising:
an inner edge rotatably coupled to a terminal and configured to enable the protective case to rotate between a closed position and an opened position;
a rigid main body that is not foldable, that has a shape corresponding to a shape of the terminal, and that protects the terminal when the protective case is in the closed position;
an outer edge of the protective case that is located at an opposite side of the rigid main body from the inner edge;
a top edge of the protective case that extends between the inner edge and the outer edge;
a bottom edge of the protective case that extends between the inner edge and the outer edge, wherein the top edge and the bottom edge are separated by the rigid main body; and
a plurality of capacitive sensing bodies, wherein each of the plurality of capacitive sensing bodies has a unique position location on the rigid main body between the inner edge and the outer edge and between the top edge and the bottom edge such that each of the plurality of capacitive sensing bodies is a different distance from a touchscreen; and
the terminal configured for removable installation of the protective case, wherein the terminal comprises:
the touchscreen comprising capacitance detectors and capacitors, wherein the capacitance detectors are configured to detect capacitance values of the capacitors, and wherein the capacitance values are generated according to the capacitors and the capacitive sensing bodies in the protective case;
a memory; and
a processor coupled to the memory and the touchscreen, wherein the processor is configured to:
store a first preset trigger sequence of the capacitive sensing bodies, wherein the first preset trigger sequence comprises a first order in which each of the capacitive sensing bodies is triggered;
store a second preset trigger sequence of the capacitive sensing bodies, wherein the second preset trigger sequence comprises a second order in which each of the capacitive sensing bodies is triggered, and wherein the second order is opposite of the first order;
compare a trigger sequence of the capacitive sensing bodies that are detected by the capacitance detectors to the first preset trigger sequence and the second preset trigger sequence;
determine that the protective case is in the closed position corresponding to a sleep state based on the trigger sequence matching the first preset trigger sequence;
determine that the protective case is in the opened position corresponding to a wake state based on the trigger sequence matching the second preset trigger sequence;
output an activation signal to put the terminal in the wake state in response to the trigger sequence matching the first preset trigger sequence; and output an interrupt signal to put the terminal in the sleep state in response to the trigger sequence matching the second preset trigger sequence.

3. A sensing method applied to a terminal suitable for removable installation of a non-foldable protective case that protects a touchscreen of the terminal, wherein the sensing method comprises:

storing a first preset trigger sequence of capacitive sensing bodies, wherein the first preset trigger sequence comprises a first order in which each of the capacitive sensing bodies is triggered and wherein each of the capacitive sensing bodies has a unique position location on a rigid main body between an inner edge and an outer edge and between a top edge and a bottom edge such that each of the capacitive sensing bodies is a different distance from the touchscreen;

storing a second preset trigger sequence of the capacitive sensing bodies, wherein the second preset trigger sequence comprises a second order in which each of the capacitive sensing bodies is triggered, and wherein the second order is opposite of the first order;

detecting a trigger sequence of capacitors in the touchscreen;

determining that the non-foldable protective case is in an opened position corresponding to a wake state based on the trigger sequence matching the first preset trigger sequence;

determining that the non-foldable protective case is in a closed position corresponding to a sleep state based on the trigger sequence matching the second preset trigger sequence;

outputting an activation signal to put the terminal in the wake state in response to the trigger sequence matching the first preset trigger sequence; and outputting an interrupt signal to put the terminal in the sleep state in response to the trigger sequence matching the second preset trigger sequence.

\* \* \* \* \*

UNITED STATES PATENT AND TRADEMARK OFFICE
CERTIFICATE OF CORRECTION

PATENT NO. : 11,481,075 B2
APPLICATION NO. : 15/318096
DATED : October 25, 2022
INVENTOR(S) : Chunjiang Zhao It is certified that error appears in the above-identified patent and that said Letters Patent is hereby corrected as shown below:

In the Claims

Claim 2, Column 14, Line 42: "sequence comprises" should read "comprises"

Signed and Sealed this
Twenty-seventh Day of December, 2022

Katherine Kelly Vidal
*Director of the United States Patent and Trademark Office*